April 11, 1939.  F. J. WESTROPE  2,153,734
HINGE
Filed Nov. 21, 1936
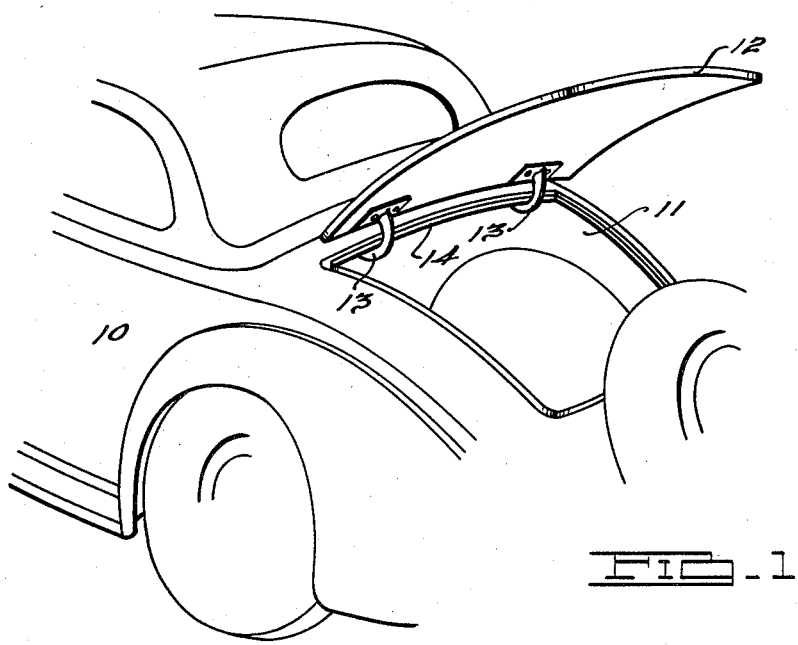
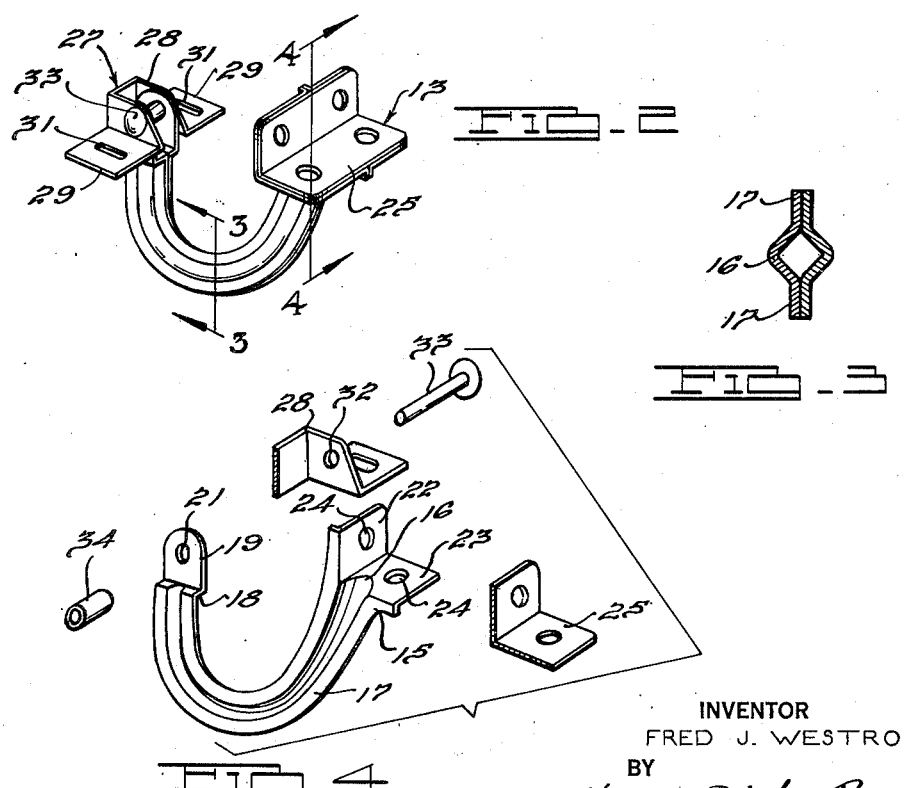
INVENTOR
FRED J. WESTROPE
BY
Harness, Dickey, Pierce & Hans
ATTORNEYS.

Patented Apr. 11, 1939

2,153,734

UNITED STATES PATENT OFFICE 2,153,734

HINGE

Fred J. Westrope, Detroit, Mich., assignor to The Murray Corporation of America, Detroit, Mich., a corporation of Delaware Application November 21, 1936, Serial No. 111,989

8 Claims. (Cl. 16—135)

This invention relates to hinges for doors, and particularly to a fabricated hinge constructed from a plurality of stamped elements and formed to provide material strength and reinforcement.

Accordingly, the main objects of my invention are; to construct a hinge of right and left hand stampings which are preformed to provide strength thereto; to provide flanges on one end of the stampings which are in aligned relation when the portions are assembled and which may be reinforced by a plate; to provide a hinge having one branch of U-shape formed of right and left stampings having a central embossed portion which forms a box section when secured together; to fabricate a U-shaped hinge from stampings which are so formed as to provide a bifurcated end portion which is pivoted to a supporting element; and in general, to construct a stamped hinge which is extremely rigid and economical of manufacture.

Other objects and features of novelty of my invention will be specifically pointed out, or will become apparent when referring, for a better understanding of my invention, to the following description taken in conjunction with the accompanying drawing, wherein:

Figure 1 is a broken view of an automobile body showing the hinges of a deck door, embodying features of my invention;

Fig. 2 is an enlarged view, in perspective, of a hinge illustrated in Fig. 1;

Fig. 3 is an enlarged sectional view of the structure illustrated in Fig. 2, taken on the line 3—3 thereof, and Fig. 4 is a broken, exploded view of the hinge illustrated in Fig. 2.

In Fig. 1, I have illustrated a vehicle body 10 having a rear deck opening 11 and a door 12 for closing the opening. The deck door 12 is supported by a pair of hinges 13 each having a "goose necked" or U-shaped leaf to provide clearance for the rabbet 14 disposed about the marginal edge of the opening 11.

In Figs. 2, 3, and 4, I have illustrated the hinge 13 as being fabricated from a plurality of stampings secured together by welding. The main leaf 15 is of U-shape to provide clearance as pointed out hereinabove. The U-shaped stampings have their central portion angularly embossed at 16 to provide strength to the body portion. The side flanges 17 are mated together and are welded to form a unit construction as illustrated in Figs. 2 and 3. The ends of the main stampings extend outwardly at 18 and are projected at 19 and provided with apertures 21. The two extensions 19 formed on the stamping provide a bifurcated end to the U-shaped leaf.

The opposite end of the U-shaped leaf is flanged laterally to form angularly disposed flanges 22 and 23 having apertures 24 provided therein. The branch thus formed is illustrated in Fig. 4 as a right hand stamping which mates with a similar stamping of left hand disposition. This is clearly disclosed in Fig. 2, the stampings being exactly alike except for right and left hand disposition. After assembling the right and left hand stampings by welding along the flanges 17 as illustrated in Fig. 3, to have the angularly disposed flanges 22 and 23 in aligned relation to each other, an angle plate 25 of the same contour and dimensions as the flanges 22 and 23, reinforces the flanges when secured thereto by welding or otherwise.

A bracket 27 supports the bifurcated end of the hinge. The bracket has a channel portion 28 and laterally extending flanges 29 in which slots 31 are provided for adjusting the hinge to have the deck door 12 fit accurately with the edge of the opening 11. Apertures 32 are provided in the walls of the channel element for receiving a pivot pin 33 which passes through the apertures 21 in the extensions 19 of the hinge portion and through a spacing tube 34 provided therebetween. The bracket 27 is secured on the under surface of the deck while the plate 25 is secured to the top edge of the door 12. A pair of these hinges rigidly supports the door relative to the opening.

The hinge thus constructed is extremely rigid and economical of manufacture. The material employed in the hinge may be scrap metal parts obtained from stamping operation on the body panels. The elements are positioned in suitable jigs and welded together. Due to the particular shape and the embossing of the stamped elements, an extremely rigid and durable hinge is provided.

Although I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A hinge comprising a bracket and a leaf portion, said leaf portion formed of right and left hand stampings each having an offset end portion whereby to provide spaced extensions at one end thereof, aligned flanges at the opposite ends thereof, a reinforcing plate secured to said aligned flanges, said bracket receiving said spaced extensions and a pivot joining said bracket thereto.

2. A hinge made up of a plurality of stampings including, in combination, a right and a left hand U-shaped leaf portion each embossed a substantial part of its length inwardly from the side edges, said portions being joined at their edges, one end of each of said stampings being bent laterally to provide aligned flanges, the other end of each of said stampings being offset from the body portion thereof whereby to form a bifurcated end portion, a bracket for receiving said bifurcated end portion, and a pivot for joining said bracket and portion.

3. A hinge including, in combination, a U-shaped leaf formed from a right and a left hand stamping welded together, each of said stampings having an end portion thereof offset from the body portion thereof to form a bifurcated end portion for said hinge leaf, a bracket for receiving said end portion, and a pivot for joining said end portion to said bracket.

4. A hinge including, in combination, a U-shaped leaf element constructed from right and left hand complemental stampings each having an end portion offset from the body portion thereof, said stampings being joined together to provide a bifurcated extension on one end of said leaf element and angularly disposed aligned flanges formed on the opposite ends of each of said stampings, a bracket for receiving said bifurcated end portion, and a pivot for joining said bracket to said bifurcated extension.

5. A hinge including, in combination, a U-shaped leaf element constructed from right and left hand complemental stampings each having an offset end portion whereby to provide, when said stampings are joined together, a bifurcated extension on one end of said leaf element, angularly disposed aligned flanges formed on the opposite ends of said stampings, a bracket for receiving said bifurcated end portion, a pivot for joining said bracket to said end portion and a reinforcing plate secured to said aligned flanges.

6. A hinge including, in combination, a U-shaped leaf element constructed from right and left hand complemental stampings joined together with one end of the stampings unsecured and spaced from each other to provide a bifurcated extension at one end of said leaf element, angularly disposed flanges on the opposite ends of said stampings, a bracket adapted to receive said bifurcated end portion, a pivot for joining said bracket to said end portion, and a spacing tube disposed between the flanges of said bifurcated end portion through which said pivot extends.

7. A sheet metal hinge structure including a stamping having spaced parallel walls, a hinge leaf element comprising a pair of sheet metal stampings secured together medially of the end portions thereof, one of the ends of said stampings having the unsecured portions offset to provide a bifurcated end for said hinge leaf element when said stampings are secured together, the offset ends of said stampings adapted to lie adjacent the walls of said first mentioned stamping, and a pivot pin passing through the walls of said first mentioned stamping and the offset ends of said hinge leaf element to provide a pivotal connection therebetween.

8. A sheet metal hinge structure including a stamping having spaced parallel walls, a hinge leaf element comprising a pair of sheet metal stampings secured together medially of the end portions thereof, one of the ends of said stampings having the unsecured portions offset to provide a bifurcated end for said hinge leaf element when said stampings are secured together, the offset ends of said stampings adapted to lie adjacent the walls of said first mentioned stamping, a pivot pin passing through the walls of said first mentioned stamping and the offset ends of said hinge leaf element to provide a pivotal connection therebetween, and a spacing tube surrounding said pin and lying between the offset ends of said leaf element to maintain the same adjacent the walls of said first mentioned stamping.

FRED J. WESTROPE.